United States Patent [19]

Fuchs et al.

[11] Patent Number: 4,603,866
[45] Date of Patent: Aug. 5, 1986

[54] SHAFT AND RADIALLY-SEALING RING WITH COLD FLEXED SEAL DISK

[75] Inventors: Dieter Fuchs, Riedstadt; Wolfgang Schmitt, Viernheim, both of Fed. Rep. of Germany

[73] Assignee: H. Weissenfeld-Richters, Weinheim, Fed. Rep. of Germany

[21] Appl. No.: 811,896

[22] Filed: Dec. 20, 1985

Related U.S. Application Data

[63] Continuation-in-part of Ser. No. 775,470, Sep. 12, 1985.

[30] Foreign Application Priority Data

Jan. 15, 1985 [DE] Fed. Rep. of Germany ....... 3501065

[51] Int. Cl.$^4$ ............................................. F16J 15/32
[52] U.S. Cl. ......................................... 277/152; 277/9
[58] Field of Search ............... 277/25, 152, 153, 134, 277/1, 9

[56] References Cited

U.S. PATENT DOCUMENTS

| | | | |
|---|---|---|---|
| 3,275,331 | 9/1966 | Mastrobattista et al. | 277/152 X |
| 3,511,512 | 5/1970 | Wheelock | 277/153 X |
| 3,857,156 | 12/1974 | Clark | 277/134 X |
| 4,194,748 | 3/1980 | Forch et al. | 277/134 X |
| 4,283,064 | 8/1981 | Staab et al. | 277/134 X |
| 4,350,351 | 9/1982 | Martin | 277/153 X |
| 4,451,050 | 5/1984 | Repella | 277/134 |
| 4,497,496 | 2/1985 | Repella | 277/134 |
| 4,522,411 | 6/1985 | Burgan | 277/153 X |

FOREIGN PATENT DOCUMENTS

| | | | |
|---|---|---|---|
| 845584 | 8/1952 | Fed. Rep. of Germany | 277/152 |
| 2229682 | 1/1974 | Fed. Rep. of Germany | 277/152 |
| 2801711 | 9/1978 | Fed. Rep. of Germany | 277/153 |
| 56-156553 | 12/1981 | Japan | 277/152 |
| 398219 | 2/1966 | Switzerland | 277/152 |

*Primary Examiner*—Robert S. Ward
*Attorney, Agent, or Firm*—Felfe & Lynch

[57] ABSTRACT

The inside of a planar, annular disk having a thickness of from about 0.8 to about 2 mm is cold flexed into a cylindrical, sealing stub about a shaft. For this, the inside diameter of the disk before cold flexing about the shaft is from about 1 to about 6 times the thickness of the disk less than the diameter of the shaft. A stiffening ring is sealingly attached about the outside of the disk with the line of the innermost attachment therebetween being from about 1.1 to about 4 times the thickness of the disk from the surface of the shaft.

16 Claims, 2 Drawing Figures

SHAFT AND RADIALLY-SEALING RING WITH COLD FLEXED SEAL DISK

This is a continuation-in-part of copending U.S. patent application Ser. No. 775,470 filed Sept. 12, 1985.

BACKGROUND OF THE INVENTION

The invention relates to a shaft and a ring for sealing radially thereabout.

A known seal ring is produced from a planar, annular disk of a non-elastomeric plastic, preferably polytetrafluoroethylene. The outer circumference of the disk is held about a shaft in a stiffening ring and the inner circumference of the disk is cold flexed about the shaft in the direction of the space to be sealed to form a cylindrical stub which engages the shaft under bias.

German Federal patent publication OS No. 25 53 290 describes a seal ring of the above kind. Its planar, annular disk has ribs projecting inwardly from its cylindrical-stub portion and contacting the shaft for pumping back any leakage. For this reason, attaining good sealing action depends on the shaft turning at the correct speed.

If the circumferential speed of the shaft is too great, so is the pumping action of the ribs. This can cause lubrication failure around the dynamic sealing zone of the ribs as well as the pumping of dust from the surroundings into the dynamic sealing zone and even into the sealed chamber. These events are undesirable and can result in the premature failure of the seal.

If the circumferential speed of the shaft is too small, so is the pumping action of the ribs. This shifts the dynamic sealing zone toward the outside, away from the sealed chamber, especially in the interstices between the individual ribs, which causes undesirable contamination. Particularly when the shaft is at rest, and in cases in which pressure builds up in the sealed chamber, this effect is plain to see.

SUMMARY OF THE INVENTION

An object of the invention is, therefore, improving a seal ring of the kind described above such that its described disadvantages do not occur, i.e. to assure good sealing action regardless of whether the sealed shaft is at rest or in rotation and to permit the sealing of higher pressures.

To this and other ends, the invention provides a shaft and seal ring in combination and best described, at least in part, by the process of its manufacture.

The seal ring is made from an annular disk of a non-elastomeric plastic, preferably polytetrafluoroethylene. The disk is initially planar, i.e. it has parallel annular surfaces, with a thickness between the parallel surfaces of from about 0.8 to about 2 mm and an inside diameter that is from about 1 to about 6 times the thickness of the disk less than the diameter of the shaft.

The inside of the annular, planar disk is then cold flexed about the shaft in the direction of the space to be sealed. This forms a cylindrical stub which engages the shaft under bias.

The outside of the disk is sealingly connected by clamping, for example, to a stiffening ring, preferably before the inside of the disk is cold flexed about the shaft. The stiffening ring is for mounting the seal ring about the shaft. The radially-innermost line of the sealing connection of the stiffening ring about the disk on either side of the disk is from about 1.1 to about 4 times the thickness of the disk from the surface of the shaft when the inside of the disk has been cold flexed thereabout.

Preferably, the disk has a thickness of from about 1.4 to about 1.7 mm, an initial inside diameter of from about 1.5 to about 3 times its thickness less than the diameter of the shaft, and a distance from the shaft to the innermost line of connection to the stiffening ring from about 1.2 to about 1.7 times the thickness of the disk.

The seal ring of the invention is substantially smaller and more compact than embodiments in accordance with the state of the art described above. Nevertheless, it is entirely adequate in relation to the radial displacements of the shaft which occur in normal machine constructions. In particular, shafts having diameters ranging between about 5 and about 40 mm can be sealed in an excellent manner with the ring of the invention.

The axial length of the dynamic sealing zone about the cold-flexed, cylindrical stub is extraordinarily short. This better assures the necessary lubrication in this critical area by the generally-fluid medium being sealed. Also of great importance in this regard is the use of the non-elastomeric plastic, especially polytetrafluoroethylene, for producing the seal ring.

To facilitate installation about the shaft, the inside of the disk can first be flexed conically, for example by using a shaping tool. However, it is of decisive importance to avoid any heating of the material in this forming process so as not to impair the shape-recovering tendency of the disk material. This assures uniform bias of the cylindrical stub, end section of the disk against the surface of the shaft over long periods of time because the axial expansion of the disk to form the cylindrical-stub dynamic sealing zone is slight and the good lubrication thus achieved will forestall any excessive heating during normal operation which would impair it.

The disk has no hydrodynamically-acting back-feed elements facing the shaft about its cylindrical-stub dynamic sealing zone. Sealing effectiveness is thus independent of whether the shaft is at rest or in rotary movement. Even alternating directions of rotation, changing rotary speeds and alternating axial directions of positive pressure differential produce no adverse effect. The seal ring is therefore excellently suited for sealing the pump shaft of a coolant pump of a motor vehicle.

In a preferred embodiment, the portion of the disk clamped in the stiffening ring and the shaft are approximately at a right angle. Other orientations are possible, but the right-angle relationship achieves an especially long useful life and good sealing results.

The side of the stiffening ring opposite that toward which the disk is cold flexed into the cylindrical stub can have an annular projection extending inwardly to the immediate vicinity of the shaft. This improves the axial support of the cylindrical-stub, dynamically-sealing end section of the disk, and gives the added advantage of making the dynamically-sealing cylindrical stub less accessible to undesirable exterior dirt and dust.

To reduce manufacturing costs, it has proven advantageous for the stiffening ring to be made of a plastic injection-molded onto the outer margin of the disk. Thermosetting materials have been preferred. Problems regarding the fastening and sealing together with the two parts can thus be reliably prevented.

BRIEF DESCRIPTION OF THE DRAWINGS

Merely-preferred embodiments which illustrate but do not limit the invention will now be described with reference to drawings thereof, in which.

DESCRIPTION OF THE PREFERRED EMBODIMENTS

Figure 1:
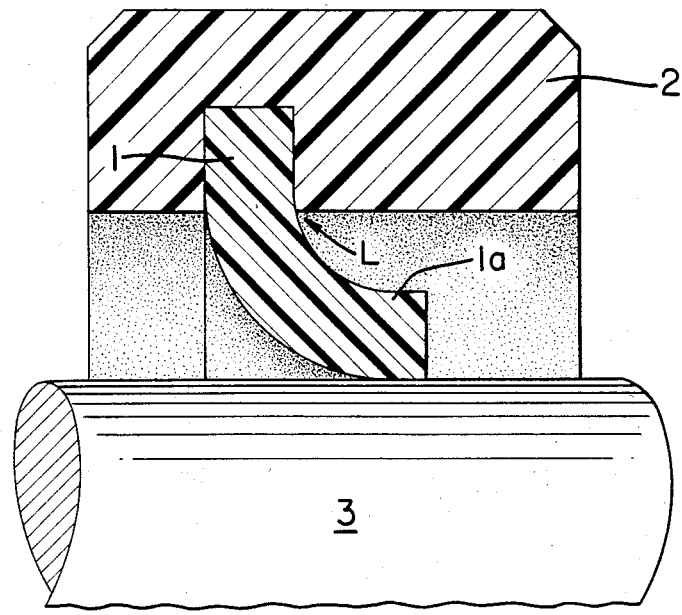
FIG. 1 is half a side elevation, partly in cross section, of one preferred embodiment.

The preferred embodiment shown in FIG. 1 has an annular disk 1. The outside of the annular disk has been sealingly clamped in a groove of a stiffening ring 2 which, together with the disk, forms a seal ring. The inside of the annular disk has been cold flexed about a shaft 3 to form a cylindrical stub 1a on one end of the disk which dynamically seals about the shaft when the shaft rotates relative to the seal ring and statically seals, when the shaft is not relatively rotating.

The stiffening ring is produced from a glass fiber-filled phenolic resin formed directly on the outer circumference of the disk. The disk is thus bonded unremovably and in a liquid-tight manner in the stiffening ring. In the area of the bond, the disk forms a right angle with the shaft.

The disk is made of polytetrafluoroethylene. For the sealing about the shaft which has a 16 mm diameter, it has an outside diameter of 25.0 mm and a thickness of 1.5 mm. Before being cold flexed about the shaft, the disk was planar and had an inside diameter of 13 mm. The axial length of the contact surface between the disk and the surface of the shaft after installation cold flexing the disk about the shaft amounts to approximately 2 mm and is thus extremely short. The distance from the surface of the shaft 3 to the line L of the innermost portion of the bond between the stiffening ring and the disk is 2.0 mm.

The seal ring can be made at low cost and is easy to install. When used in the coolant pump of a motor vehicle, as intended it gives excellent sealing action through its entire life. No adverse effects of the antifreeze additives commonly used in the coolant have been observed.

Figure 2:
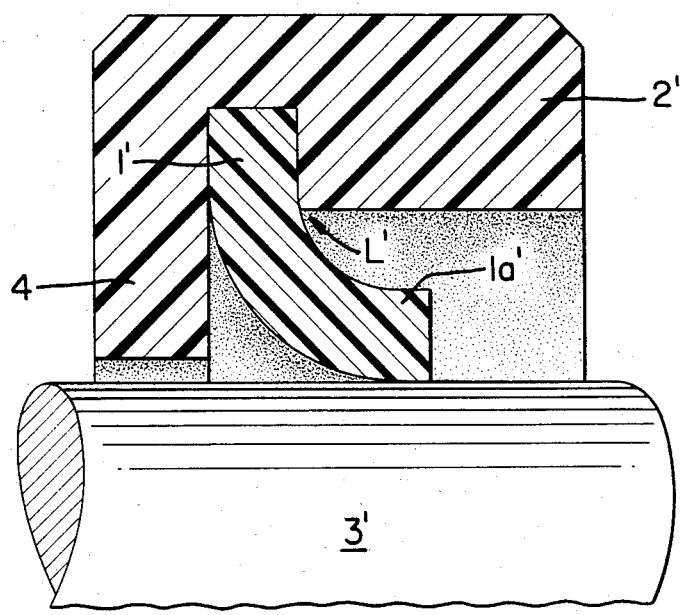
FIG. 2 is a half a side elevation, partly in cross section, of another preferred embodiment.

The seal ring 1', 2' and shaft 3' of FIG. 2 are the same as that of FIG. 1, except that the stiffening ring has the inward projection 4 on the side of the ring opposite that toward which the disk was cold flexed into the cylindrical stub 1a'. The projection 4 extends toward the shaft 3 as far as possible, i.e. to the limits of radial excursion of the shaft 3' in rotary use, to form a dirt shield and provide axial support for the disk. It is not attached to the disk, however, so that the innermost line L' of the sealing attachment of the bond between the disk and stiffening ring is at the same distance from the shaft as in the embodiment of FIG. 1.

It will be understood that the specification and examples are illustrative but not limitative of the present invention and that other embodiments within the spirit and scope of the invention will suggest themselves to those skilled in the art.

What is claimed is:

1. A shaft and seal ring combination made by the process comprising:
   providing the shaft;
   cold flexing the inside of an annular, planar disk of non-elastomeric plastic about the shaft, the disk having a thickness of form about 0.8 to about 2 mm and, before being cold flexed about the shaft, an inside diameter of from about 1 to about 6 times the thickness of the disk less than the diameter of the shaft; and
   sealingly attaching a stiffening ring about the outside of the disk, the line of the innermost sealing attachment between the stiffening ring and the disk being from about 1.1 to about 4 times the thickness of the disk from the surface of the shaft.

2. The shaft and seal ring combination of claim 1, wherein the thickness of the disk is from about 1.4 to about 1.7 mm, the inside diameter of the disk is from about 1.5 to about 3 times the thickness of the disk less than the diameter of the shaft, and the line of the innermost attachment between the stiffening ring and the disk is from about 1.2 to about 1.7 times the thickness of the disk from the surface of the shaft.

3. The shaft and seal ring combination of claim 1, wherein the portion of the disk sealingly attached to the stiffening ring is approximately at a right angle to the shaft.

4. The shaft and seal ring combination of claim 2, wherein the portion of the disk sealingly attached to the stiffening ring is approximately at a right angle to the shaft.

5. The shaft and seal ring combination of claim 1, wherein sealingly attaching the stiffening ring about the disk comprises molding a plastic thereabout.

6. The shaft and seal ring combination of claim 2, wherein sealingly attaching the stiffening ring about the disk comprises molding a plastic thereabout.

7. The shaft and seal ring combination of claim 3, wherein sealingly attaching the stiffening ring about the disk comprises molding a plastic thereabout.

8. The shaft and seal ring combination of claim 4, wherein sealingly attaching the stiffening ring about the disk comprises molding a plastic thereabout.

9. The shaft and seal ring combination of claim 1, and further comprising providing an inward, annular projection from the stiffening ring on the side thereof opposite that toward which the disk is cold flexed for axially supporting the disk.

10. The shaft and seal ring combination of claim 2, and further comprising providing an inward, annular projection from the stiffening ring on the side thereof opposite that toward which the disk is cold flexed for axially supporting the disk.

11. The shaft and seal ring combination of claim 3, and further comprising providing an inward, annular projection from the stiffening ring on the side thereof opposite that toward which the disk is cold flexed for axially supporting the disk.

12. The shaft and seal ring combination of claim 4, and further comprising providing an inward, annular projection from the stiffening ring on the side thereof opposite that toward which the disk is cold flexed for axially supporting the disk.

13. The shaft and seal ring combination of claim 5, and further comprising providing an inward, annular projection from the stiffening ring on the side thereof opposite that toward which the disk is cold flexed for axially supporting the disk.

14. The shaft and seal ring combination of claim 6, and further comprising providing an inward, annular projection from the stiffening ring on the side thereof opposite that toward which the disk is cold flexed for axially supporting the disk.

15. The shaft and seal ring combination of claim 7, and further comprising providing an inward, annular projection from the stiffening ring on the side thereof opposite that toward which the disk is cold flexed for axially supporting the disk.

16. The shaft and seal ring combination of claim 8, and further comprising providing an inward, annular projection from the stiffening ring on the side thereof opposite that toward which the disk is cold flexed for axially supporting the disk.

* * * * *

UNITED STATES PATENT AND TRADEMARK OFFICE
CERTIFICATE OF CORRECTION

PATENT NO. : 4,603,866
DATED : August 5, 1986
INVENTOR(S) : Dieter Fuchs, et al.

It is certified that error appears in the above-identified patent and that said Letters Patent is hereby corrected as shown below:

On the Title page:

Item [73], "H. Weissenfeld-Richters" should be

-- Firma Carl Freudenberg --.

Signed and Sealed this

Twenty-eighth Day of October, 1986

[SEAL]

*Attest:*

DONALD J. QUIGG

*Attesting Officer*     *Commissioner of Patents and Trademarks*